United States Patent
Hsiao

(10) Patent No.: US 7,519,841 B2
(45) Date of Patent: Apr. 14, 2009

(54) POWER CONTROL CIRCUIT

(75) Inventor: Wen-Chuan Hsiao, Taipei (TW)

(73) Assignee: Elitegroup Computer Systems Co., Ltd., Neihu District, Taipei (TW)

( * ) Notice: Subject to any disclaimer, the term of this patent is extended or adjusted under 35 U.S.C. 154(b) by 494 days.

(21) Appl. No.: 11/482,605

(22) Filed: Jul. 6, 2006

(65) Prior Publication Data

US 2007/0294547 A1   Dec. 20, 2007

(30) Foreign Application Priority Data

Jun. 19, 2006  (TW) ............................ 95121864 A

(51) Int. Cl.
*G06F 1/26* (2006.01)

(52) U.S. Cl. .................. 713/300; 713/310; 713/320; 713/322; 713/323

(58) Field of Classification Search ................... 713/300
See application file for complete search history.

(56) References Cited

U.S. PATENT DOCUMENTS

| | | | |
|---|---|---|---|
| 6,393,573 B1 * | 5/2002 | Gillespie et al. ............. | 713/324 |
| 6,906,433 B2 * | 6/2005 | Nguyen ........................ | 307/31 |
| 6,988,214 B1 * | 1/2006 | Verdun ........................ | 713/320 |
| 7,411,128 B2 * | 8/2008 | Drotleff et al. ............. | 174/74 R |
| 2003/0014675 A1 * | 1/2003 | Lee ............................. | 713/310 |

* cited by examiner

*Primary Examiner*—Nitin C Patel
(74) *Attorney, Agent, or Firm*—Winston Hsu

(57) ABSTRACT

A power control circuit is provided. The circuit is adapted for an advanced configuration and power interface (ACPI) controller to transform output signals of a chipset which outputs a STR (Suspend to RAM) control signal and a power control signal. The circuit generates control signals of the ACPI controller by performing logical operations on the STR control signal and the power control signal. The control signals of the ACPI controller are used to regulate the power supply state of a host system.

9 Claims, 1 Drawing Sheet

POWER CONTROL CIRCUIT

CROSS-REFERENCE TO RELATED APPLICATION

This application claims the priority benefit of Taiwan application Ser. No. 95121864, filed on Jun. 19, 2006. All disclosure of the Taiwan application is incorporated herein by reference.

BACKGROUND OF THE INVENTION

1. Field of the Invention

The present invention is related to a power control circuit of power control signal. In particular, to a power control circuit that applies between the chipset and the power interface controller.

2. Description of the Related Art

Due to the importance of the environmental protection and power efficiency, advanced configuration and power interface (ACPI) standard had became a necessary standard, i.e. standard that the motherboard is necessary to support.

However, it's not definitely that chipset designed by every company (south bridge chip and north bridge chip) all support advanced configuration and power interface controller standard (hereinafter called power interface controller or ACPI controller). In the conventional technology, ACPI controller always adjusts the power supply of the host system according to two control signals (known as S3 and S5). But chipsets without supporting ACPI standard can't simultaneously provide S3 and S5 control signals, which means can't directly control ACPI controller to adjust power supply state of the host system.

SUMMARY OF THE INVENTION

The primary purpose of the present invention is to provide a power control circuit that transfers the power control signal and STR (Suspend to RAM; S3) control signal of the chipset itself by logic operation circuit so as to produce control signal that meet the ACPI standard. Therefore chipsets without supporting ACPI standard can also produce signals equal to S3 and S5 function and further to control the power interface controller.

Another purpose of the present invention is to provide a power control circuit implemented by dissipation components (such as SMT) to integrate with chipset into the PCB (Printed circuit board) and further reduce the steps of design and manufacture and cost down.

To achieve above and other purposes, the present invention provides a power control circuit that applies to transfer an output signal of a chipset that applied to a power control circuit. The chipset outputs a STR control signal and a power control signal. The power control circuit includes a first inverter, a second inverter, an AND gate and an OR gate.

Therein, the first inverter is use to invert STR control signal and output an inverted STR signal, the second inverter is use to invert a power control signal and output an inverted power signal. The AND gate couples to the second inverter and output a first interface signal according to the STR control signal and the inverted power signal. The OR gate couples to the output terminal of the first inverter and output terminal of the second inverter and outputs a second interface signal according to the inverted STR control signal and the inverted power signal. Therein, the power interface controller adjusts the power supply state of the host system according to the first interface signal and the second interface signal.

The present invention is implemented by dissipation component and integrates with the chipset to the PCB and reduces process of the design and manufacture and cost down therefore. And the present invention transfer the timing of the STR control signal and power control signal of the chipset itself to control signal that meet ACPI standard by using logic operation components. Therefore, the present invention can apply to chipsets without supporting control signals with S3 and S5 function to enable the chipsets applying on ACPI controller.

To easily understand the present invention and other purposes, characteristic and advantages, following description with preferred embodiments and accompanying figures will describe in detail as follows.

DESCRIPTION OF THE PREFERRED EMBODIMENTS

Figure 1:
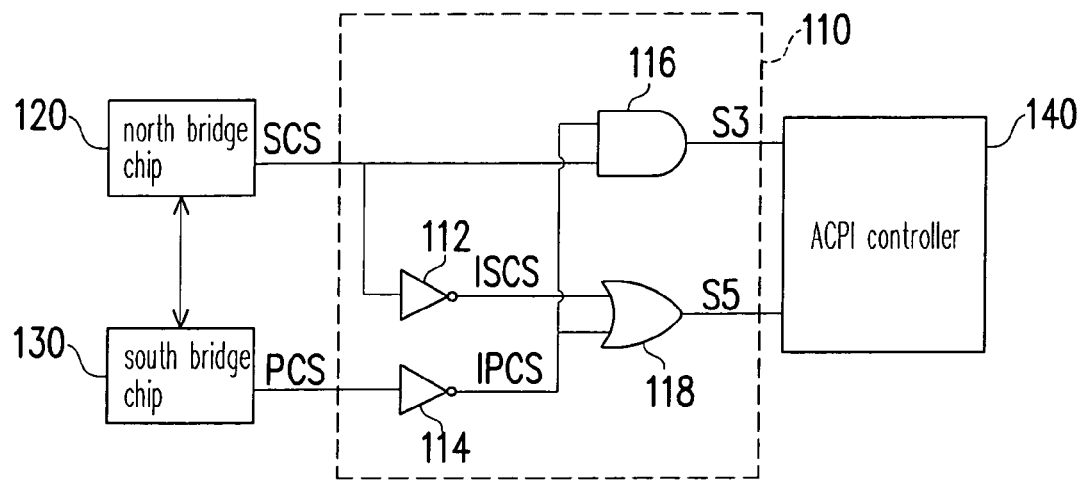
FIG. 1 illustrates a circuit diagram of power control circuit according to an embodiment of this invention.

FIG. 1 according to the present invention is a circuit diagram of power control circuit of an embodiment. The power control circuit 110 (hereinafter call 110) couples between a chipset (north bridge chip 120 and south bridge chip 130) and a power interface controller 140 (hereinafter call ACPI controller 140). Therein the north bridge chip 120 outputs a STR control signal SCS (such as signal output from a pin 3V3AUX of the chipset by Silicon Integrated Systems Corp., (SiS)) and the south bridge chip 130 outputs a power control signal PCS (such as signal output from a pin pson# of the chipset by Silicon Integrated Systems Corp., (SiS)). And ACPI controller 140 adjust the power supply state of a host system according to a first interface signal S3 and a second interface signal S5 that outputted by the power control circuit 110. By disclosure of the present invention the skilled in the art should easily understand that detail operation of the north bridge chip 120, south bridge chip 130 and ACPI controller 140 in a system and therefore unnecessary to describe further.

The power control circuit 110 includes inverters 112, 114, an AND gate 116 and an OR gate 1118. Output terminal of the inverter 112 couples to the north bridge chip 120 to invert the STR control signal SCS and outputs an inverted STR control signal ISCS. Output terminal of the inverter 114 couples to the south bridge chip 130 to invert the power control signal SCS and inverted an inverted power control signal IPCS. Two output terminals of the AND gate 116 couples to output terminals of the north bridge chip 120 and the inverter 114 respectively and output a first interface signal S3 according to the STR control signal SCS and the inverted power control signal IPCS. Two output terminals of the OR gate 118 couples to output terminals of the inverter 112 and the inverter 114 respectively and output a second interface signal S5 according to the inverted STR control signal ISCS and the inverted power control signal IPCS.

Figure 2:
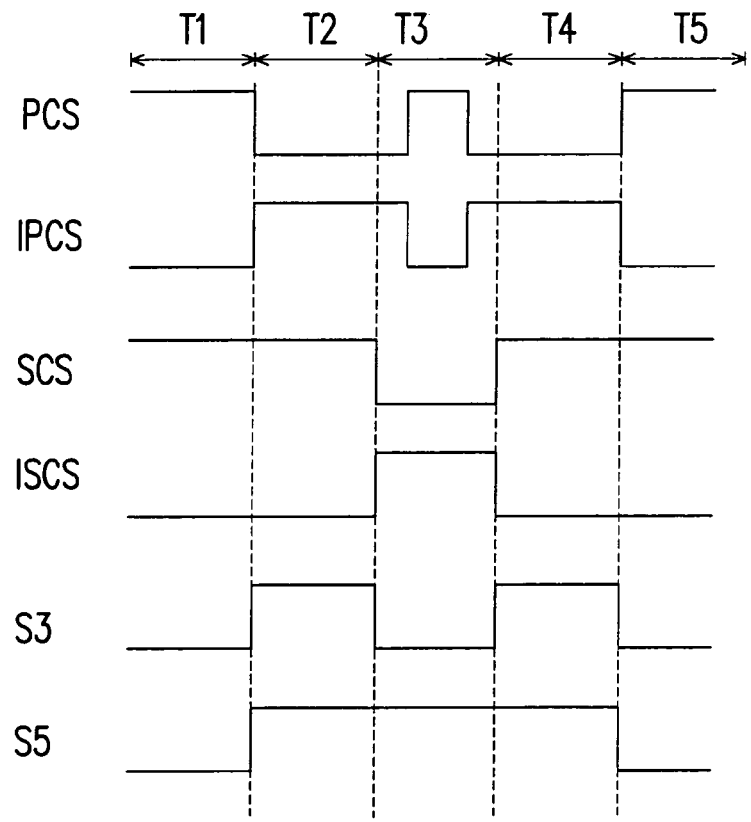
FIG. 2 illustrates a signal waveform diagram according to the present embodiment.

Next further to describe a signal waveform of the present embodiment, FIG. 2 is a signal waveform diagram according to the present embodiment. The inverted STR control signal ISCS is a signal waveform of the STR control signal SCS being inverted.

The STR control signal SCS includes two states, i.e. STR state and normal state. In the present embodiment logic low (logic 0) represents the STR state (such as the STR control signal SCS during a T3 period) and logic high (logic 1) represents the normal state (such as the STR control signal SCS during a T2 period). And the power control signal PCS also includes two states, i.e. "On" state and "OFF" state. In the present embodiment logic low represent "ON state" (such as the power control signal PCS during a T2 period) and the host system is getting into "OFF" state when the power control signal PCS transfers from logic low to logic high.

In the present embodiment different combinations of the logic low and the logic high of the STR control signal SCS and the power control signal PCS can be used to produce a first interface signal S3 and a second interface signal S5 by logic calculation of the power control circuit 110 that enables the chipset to adjust power supply state of the system by controlling the ACPI controller 140.

In the present embodiment the host system is initialized (such as just booted) during T1 period and the STR control signal SCS and the power control signal PCS are all logic high. Meanwhile the first interface signal S# and the second interface signal S5 are all logic low and represented (S3, S5) by (0, 0).

The STR control signal SCS is logic high and the power control signal PCS is logic low during the T2 period. Then the first interface signal S3 is logic high and the second interface signal S5 is logic high after they passed the power control circuit 110, represented (S3, S5) by (1, 1). Meanwhile the ACPI controller 140 enables the host system stays at a normal power supply state.

The STR control signal SCS is logic low and the power control signal PCS is transfers to logic low from logic low during the T3 period. Then the first interface signal S3 is logic low and the second interface signal S5 is logic high after they passed the power control circuit 110, represented (S3, S5) by (0, 1). Meanwhile the ACPI controller 140 enables the host system stays at a STR state and stores system data into the memory such as dynamic random access memory or static random access memory.

The STR control signal SCS is logic high and the power control signal PCS is logic low during the T4 period. Then the first interface signal S3 is logic high and the second interface signal S5 is logic high after they passed the power control circuit 110, represented (S3, S5) by (1, 1). Meanwhile the ACPI controller 140 enables the host system stays at a normal power supply state which likes operation in T2 period.

The STR control signal SCS is logic high and the power control signal PCS is logic low during the T5 period. Then the first interface signal S3 is logic low and the second interface signal S5 is logic low after they passed the power control circuit 110, represented (S3, S5) by (0, 0). Meanwhile the ACPI controller 140 enables the host system stays at a STR state and stores system data into a disk such as hard disk. In another embodiment of the present invention the ACPI controller 140 could also enable the host system at a STR state without operation to store system data when (S3, S5) is (0, 0).

The T2~T5 period are waveform combinations of STR control signal SCS and power control signal PCS in different system states. Therein T2 period and T4 period are normal power supply states, and T3 period and T5 period are signal waveform combination in different STR states. The chipset (the north bridge chip 120 and the south bridge chip 130) can output the first interface signal S3 and the second interface signal S5 through the power control circuit 110 by using changes of signal waveform of the STR control signal SCS and the power control signal PCS that outputted. The power interface controller 140 adjusts the power supply state of the host system according to the first interface signal S3 and the second interface signal S5.

By using the STR control signal SCS and the power control signal PCS provided by the chipset itself, the present invention enables the chipset without supporting ACPI standard to integrate with the ACPI controller so as to produce an effect of same power control. To substantially increase design convenience and design cost of the chipset meanwhile the circuit of the present invention further possesses effect of reducing design process and design cost by directly implemented by the dissipation components.

It will be further understood that various changes in the details, materials, and arrangements of the parts which have been described and illustrated in order to explain the nature of this invention may be made by those skilled in the art without departing from the principle and scope of the invention as expressed in the following claims. Although the steps in the following method claims, if any, are recited in a particular sequence with corresponding labeling, unless the claim recitations otherwise imply a particular sequence for implementing some or all of those steps, those steps are not necessarily intended to be limited to being implemented in that particular sequence.

What is claimed is:

1. A power control circuit applies to transfer a output signal of a chipset for use in a power interface controller, said chipset outputs a STR(Suspend to RAM) control signal and a power supply signal, said power control circuit comprising:
    a first inverter inverts said STR control signal and output a inverted STR control signal;
    a second inverter inverts said power control signal and output a inverted power control signal;
    an AND gate is coupled to said second inverter and outputs a first interface signal according to said STR control signal and said inverted power control signal, and
    an OR gate is coupled to output terminals of said first inverter and said second inverter and outputs a second interface signal according to said inverted STR control signal and said inverted power control signal;
    Wherein said power interface controller adjusts a power supply state of a host system according to said first interface signal and said second interface signal.

2. The power control circuit according to claim 1, wherein said chipset comprises a north bridge chip which outputs said STR control signal.

3. The power control circuit according to claim 1, wherein said chipset comprises a south bridge chip which outputs said power control signal.

4. The power control circuit according to claim 1, wherein said power interface controller enables said host system stay at a normal power supply state if said first interface signal and said second interface signal are all logic high.

5. The power control circuit according to claim 1, wherein said power interface controller enables said host system stay at a STR state if said first interface signal and said second interface signal are all logic low.

6. The power control circuit according to claim 1, wherein said power interface controller enables said host system stay at a STR state and store system data in a disk if said first interface signal and said second interface signal are all logic low.

7. The power control circuit according to claim 1, wherein said power interface controller enables said host system stay at a STR state and store system data in a memory if said first interface signal is logic low and said second interface signal is logic high.

8. The power control circuit according to claim 1, wherein said power interface controller enables said host system stay at a normal power supply state if said first interface signal is logic low and said second interface signal is logic high.

9. The power control circuit according to claim 1, wherein said chipset comprises a SiS chipset.

* * * * *